(12) United States Patent
Takori et al.

(10) Patent No.: US 12,077,093 B2
(45) Date of Patent: Sep. 3, 2024

(54) VEHICLE LIGHTING DEVICE

(71) Applicant: HONDA MOTOR CO., LTD., Tokyo (JP)

(72) Inventors: Masayoshi Takori, Saitama (JP); Yuji Tsuchiya, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 18/463,299

(22) Filed: Sep. 8, 2023

(65) Prior Publication Data

US 2024/0083347 A1 Mar. 14, 2024

(30) Foreign Application Priority Data

Sep. 14, 2022 (JP) ................. 2022-146594

(51) Int. Cl.
*B60Q 1/14* (2006.01)
(52) U.S. Cl.
CPC ........ *B60Q 1/143* (2013.01); *B60Q 2300/312* (2013.01); *B60Q 2300/314* (2013.01)
(58) Field of Classification Search
CPC .............. B60Q 1/143; B60Q 2300/312; B60Q 2300/314
See application file for complete search history.

(56) References Cited

U.S. PATENT DOCUMENTS

| 2016/0229333 A1 | 8/2016 | Shiraki et al. |
| 2020/0039420 A1* | 2/2020 | Kitazawa ................. F21S 41/65 |

FOREIGN PATENT DOCUMENTS

| JP | 2013184614 A | 9/2013 |
| JP | 2016147534 A | 8/2016 |
| JP | 2021037809 A | 3/2021 |

OTHER PUBLICATIONS

Notification of Reasons for Refusal issued Jun. 18, 2024 in the JP Patent Application No. 2022-146594.

* cited by examiner

*Primary Examiner* — Robert J May
(74) *Attorney, Agent, or Firm* — CKC & PARTNERS CO., LLC

(57) ABSTRACT

A vehicle lighting device is provided which improves overlooking of pedestrians by a driver even under adverse conditions such as nighttime and rainy weather. A vehicle lighting device includes: a low-beam irradiation part that illuminates a lower irradiation region ahead and below a vehicle; a pattern irradiation part that irradiates irradiation light on a lateral irradiation region on a side of the travel path of the vehicle in an irradiation pattern in which bright regions and dark regions are alternately repeated; an environmental information acquisition device which acquires information related to the moisture environment around the vehicle; and a controller which changes the irradiation mode of the low-beam irradiation part and/or pattern irradiation part based on information acquired by the environmental information acquisition device. In one mode, the controller dims irradiation light in the low-beam irradiation part, and brightens irradiation light in the pattern irradiation part when rainy weather at night.

2 Claims, 5 Drawing Sheets

VEHICLE LIGHTING DEVICE

This application is based on and claims the benefit of priority from Japanese Patent Application No. 2022-146594, filed on 14 Sep. 2022, the content of which is incorporated herein by reference.

BACKGROUND OF THE INVENTION

Field of the Invention

The present invention relates to a vehicle lighting device.

Related Art

As a vehicle lighting device, a device has been proposed which suppresses dazzling of pedestrians, while enabling the driver to favorably visually recognize pedestrians (for example, refer to Patent Document 1). With the vehicle lighting device of Patent Document 1, the illumination amount to the upper body of the pedestrian is reduced according to the distance to the pedestrian acquired by a pedestrian detection sensor.

Patent Document 1: Japanese Unexamined Patent Application, Publication No. 2013-184614

SUMMARY OF THE INVENTION

However, with the technology of Patent Document 1, while dazzling on the side of pedestrians is suppressed, there is concern over the visibility of pedestrians as viewed from the side of the driver becoming insufficient under adverse conditions such as nighttime and rainy weather.

The present invention has been made taking account of the aforementioned situation, and has an object of providing a vehicle lighting device which improves overlooking of pedestrians by a driver even under adverse conditions such as nighttime and rainy weather. In addition, it consequently has an object of contributing to the development of sustainable transportation systems which further improve traffic safety.

A vehicle lighting device according to a first aspect of the present invention includes: a low-beam irradiation part (for example, the low-beam unit 7 described later) which illuminates a lower irradiation region (for example, the low-beam irradiation region 11 described later) ahead and below a vehicle (for example, the vehicle 2 described later); a pattern irradiation part (for example, the projector unit 8 described later) which irradiates irradiation light on a lateral irradiation region (for example, the right-side pattern irradiation region 12 described later) which is on a side of a travel path of the vehicle in an irradiation pattern in which bright regions (for example, the bright region 13 described later) and dark regions (for example, the dark region 14 described later) are alternately repeated; an environmental information acquisition device (for example, the environmental information acquisition device 20 described later) which acquires information related to a moisture environment around the vehicle; and a controller (for example, the lamp control ECU 9 described later) which changes an irradiation mode of the low-beam irradiation part and/or the pattern irradiation part based on information acquired by the environmental information acquisition device.

According to a second aspect of the present invention, in the vehicle lighting device as described in the first aspect, the controller dims irradiation light in the low-beam irradiation part, and/or brightens irradiation light in the pattern irradiation part in a case of acquiring environmental information indicating being at night and rainy weather from the environmental information acquisition device.

With the vehicle lighting device as described in the first aspect, in the case of the environmental information acquisition device acquiring information related to the moisture environment around the vehicle and transmitting to the controller, since the low-beam irradiation irradiated on the lower irradiation region from the low-beam irradiation part and the pattern irradiation irradiated from the pattern irradiation part on the pedestrian can change in response to the moisture environment around the vehicle, the pedestrian visibility on the side of the driver is maintained. In addition, it consequently has an object of contributing to the development of sustainable transportation systems which further improve traffic safety.

With the vehicle lighting device as described in the second aspect, in the case of being at night and rainy weather, since the controller dims the irradiation light in the low-beam irradiation part, it is possible to reduce the degree at which the pedestrian is illuminated by water reflection of low-beam irradiation light on the road surface. For this reason, the contrast of the irradiation pattern irradiated from the pattern irradiation part to the pedestrian is hardly hindered, and pedestrian visibility on the side of the driver is maintained.

DETAILED DESCRIPTION OF THE INVENTION

Hereinafter, an embodiment of the present invention will be explained while referencing the drawings. It should be noted that, in the following explanation, irradiation region is the irradiation area of light by the lamp, and irradiation pattern is a design by a bright region and dark region of the illumination, irradiation region, contour shape of the irradiation region, and other irradiation forms.

Figure 1:
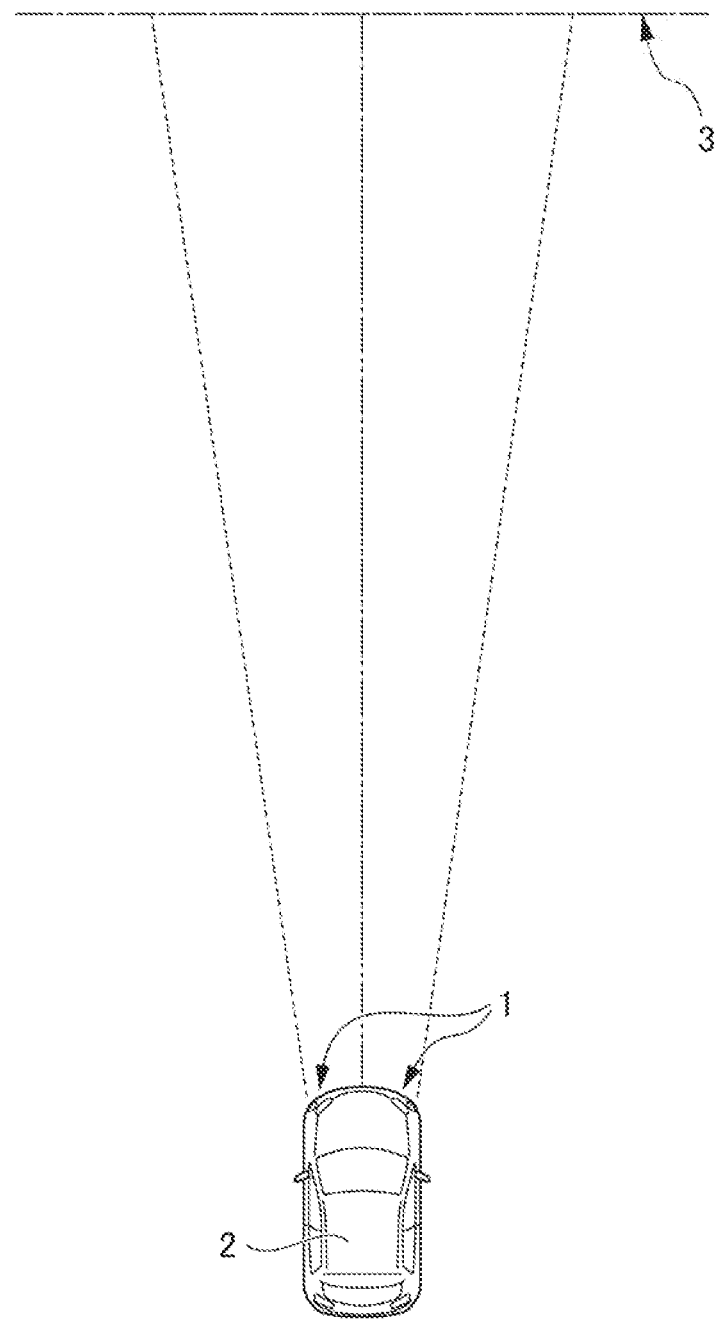
FIG. 1 is a schematic view showing an aspect of irradiation of illumination light by a vehicle lighting device according to an embodiment of the present invention.

FIG. 1 is a schematic view showing an aspect of irradiation of illumination light by a vehicle lighting device 1 according to an embodiment of the present invention. Ahead of the front of the vehicle lighting device 1 provided to a vehicle 2, for example, the distribution of irradiation light from the vehicle lighting device 1 is evaluated by an irradiation pattern formed on a test screen 3, which is a predetermined virtual vertical plane established 25 m ahead.

Figure 2:
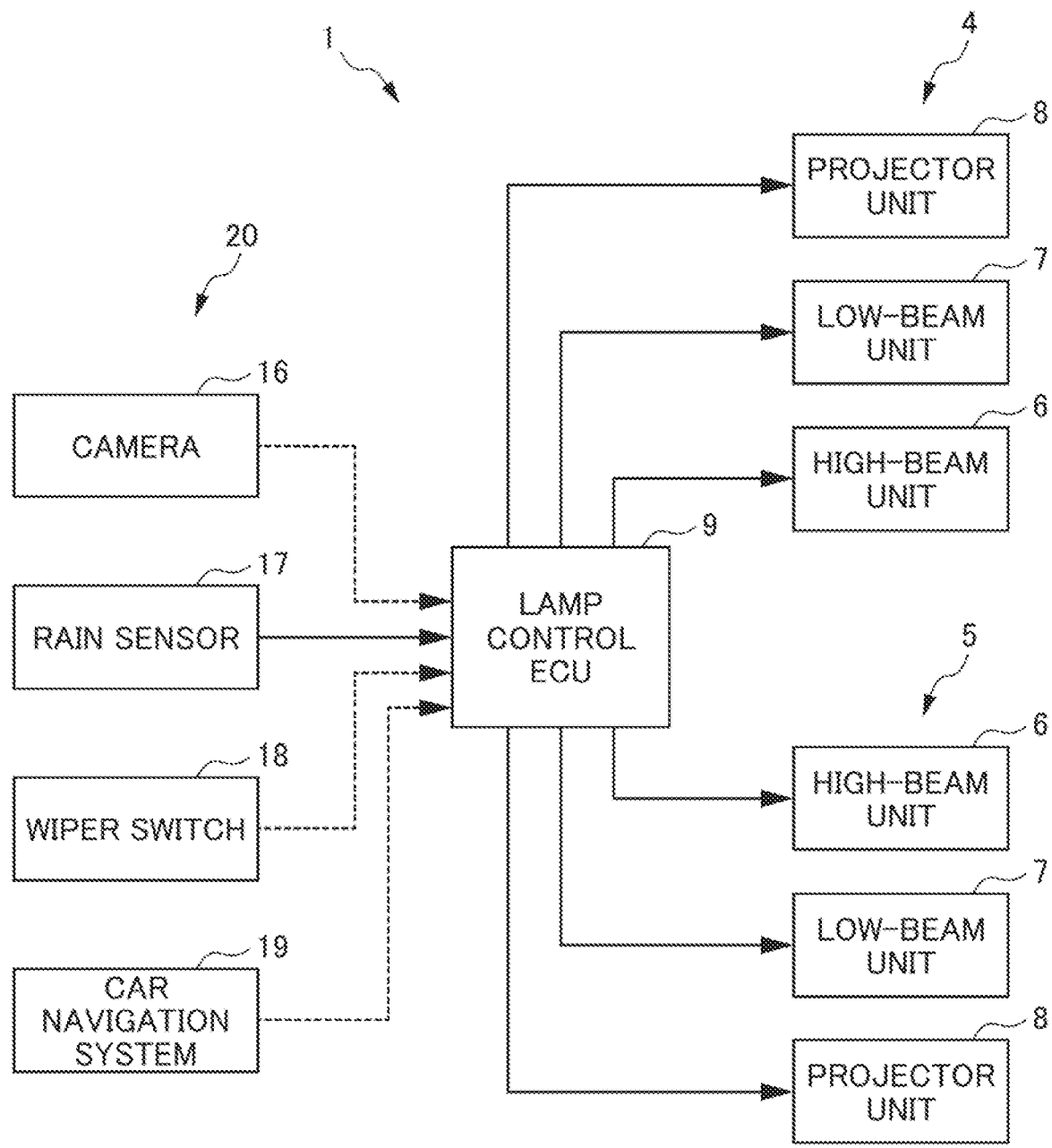
FIG. 2 is a block diagram of the vehicle lighting device according to an embodiment of the present invention.
Figure 3:
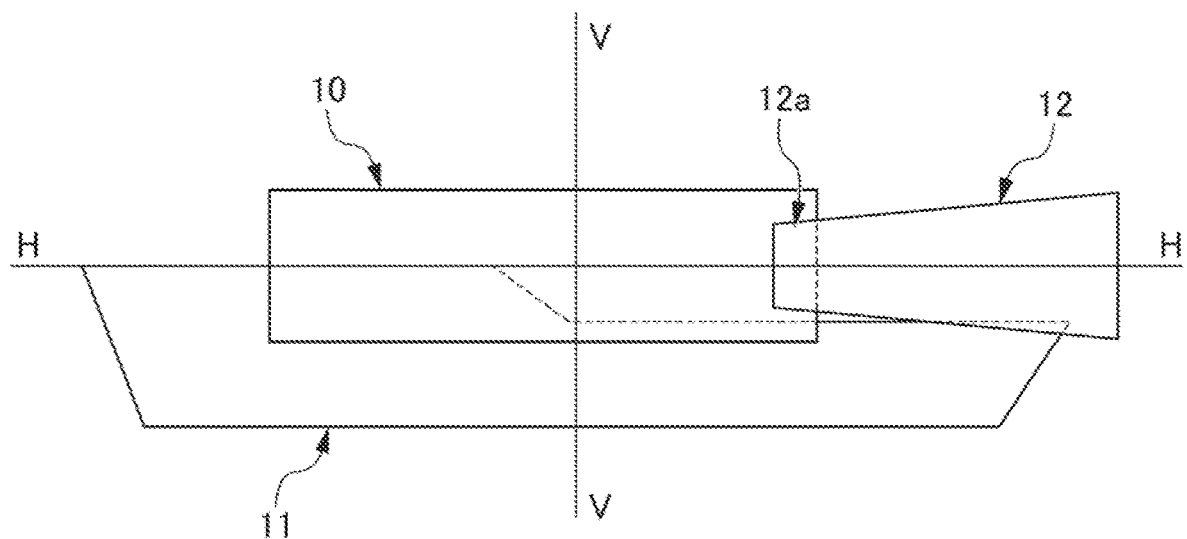
FIG. 3 is a view showing an irradiation region of each lamp in the vehicle lighting device in FIG. 2.

FIG. 2 is a block diagram of the vehicle lighting device 1, and FIG. 3 is a view showing the irradiation region of each lamp of the vehicle lighting device 1. At each of a left-side headlight unit 4 and right-side headlight unit 5 which are lamps, a high-beam unit 6, low-beam unit 7 and projector unit 8 are arranged in order from the inner side to the outer side in the vehicle-width direction of the vehicle 2. In each of the left-side headlight unit 4 and right-side headlight unit 5, the high-beam unit 6, low-beam unit 7 and projector unit 8 operate under the management of a lamp control ECU 9.

The high-beam unit 6 includes a light emitting element which is the light source, a light shield which defines the irradiation region and a lens. The light emitting element generates light by electric power being supplied from a power source (not shown), in response to a control signal from the lamp control ECU 9. The light from the light emitting element is reflected by the reflector. The reflected light from the reflector is irradiated from the lens toward a high-beam irradiation region 10 defined by the light shield.

The low-beam unit 7 includes a light emitting element which is a light source, a reflector, a light shield which defines the irradiation region, and a lens. The light emitting element generates light by electric power being supplied from a power source (not shown), in response to a control signal from the lamp control ECU 9. The light from the light emitting element is reflected by the reflector. The reflected light from the reflector is irradiated from the lens towards the low-beam irradiation region 11 defined by the light shield.

The projector unit 8 includes a light emitting element which is a light source, a spatial light modulator and a lens. As the spatial light modulator, for example, it is possible to utilize one of a form which reflects light, while independently modulating the several reflecting elements as in a DMD (Digital Micromirror Device). In this case, the projector unit 8 assumes a configuration of a DLP (Digital Light Processing: registered trademark) system using DMD, and can irradiate light in various predetermined irradiation patterns from the lens to the front of the vehicle 2 and its surroundings.

The irradiation pattern can also assume not only still image patterns of various shapes, but also the form of a video pattern. The light emitting element generates light by driving electric power being supplied from a power source (not shown) in response to a control signal from the lamp control ECU 9. The light from this light emitting element is spatially modulated by the spatial light modulator driven according to the control signal from the lamp control ECU 9, and light is irradiated from the lens of the projector unit 8 in various predetermined irradiation patterns in front of the vehicle 2 and the surroundings thereof. In other words, the projector unit 8 configures a pattern irradiation part which can vary the form of the irradiation pattern.

By referencing FIG. 3, the irradiation region by the high-beam unit 6, low-beam unit 7 and projector unit 8 will be explained in the case of irradiating light on the test screen 3 from the vehicle lighting device 1 of FIG. 1. Herein, regarding the irradiation region by the projector unit 8, the irradiation region by the projector unit 8 of the right-side headlight unit 5 is shown.

The irradiation region by the projector unit 8 of the left-side headlight unit 4 is symmetrical with the irradiation region by the projector unit 8 of the right-side headlight unit 5 with the line V-V as the axis of symmetry.

The configuration and operation of the projector unit 8 of the left-side headlight unit 4 are similar to the projector unit 8 of the right-side headlight unit 5. For this reason, the configuration and operation of the projector unit 8 of the left-side headlight unit 4 invoke the explanations for the projector unit 8 of the right-side headlight unit 5.

The low-beam irradiation region 11 by the low-beam unit 7 has an oncoming-lane side cutoff line extending in parallel to a line H-H (horizontal line) more to the right side than the line V-V (vertical line) at the center in the left/right direction on the test screen 3. In addition, it has an own-lane side cutoff line extending along the line H-H at a higher position than the oncoming-lane side cutoff line. Both the oncoming-lane side cutoff line and own-lane side cutoff line are linked by an oblique cutoff line which slopes relative to the line H-H. The low-beam irradiation region 11 is a lower irradiation region on the front lower side of the vehicle 2.

The high-beam irradiation region 10 by the high-beam unit 6 forms a rectangle having a long side parallel to the line H-H and a short side parallel to the line V-V, and an intersection of their diagonals occupy a position substantially matching the intersection of the line H-H and line V-V. The high-beam irradiation region 10 overlaps the low-beam irradiation region 11 in a lower partial region including a portion more to the line V-V of each of the oncoming lane side cutoff line and the own-lane side cutoff line. The high-beam irradiation region 10 is an upper irradiation region more upwards than the low-beam irradiation region 11, which is the lower irradiation region, and more to the central side in the vehicle-width direction of the vehicle 2.

In the right-side pattern irradiation region 12, which is the irradiation region by the projector unit 8 of the right-side headlight unit 5, the irradiation pattern variously changes such as the contour shape of the region and the form of the irradiation pattern within this region, according to the mode switching signal from the lamp control ECU 9. However, the right-side pattern irradiation region 12, even in the case of assuming any form, is a lateral irradiation region on the side of the travel path of the vehicle, occupying more to the outer side in the vehicle-width direction of the vehicle 2 than the upper irradiation region (high-beam irradiation region 10), and more to the upper side than the lower irradiation region (low-beam irradiation region 11).

Concerning the ability of the projector unit 8, the right-side pattern irradiation region 12 can assume a wide form including an overlap region 12a which overlaps with the high-beam irradiation region 10. In the case of assuming this form, the right-side pattern irradiation region 12 makes a trapezoidal shape in a landscape orientation in which the height direction is parallel to the line H-H, and the upper base and lower base are parallel to the line V-V. This trapezoid is longer at the lower base which is relatively far from the line V-V than the upper base which is relatively close to the line V-V. In other words, the right-side pattern irradiation region 12 makes a shape in which the dimension along the line V-V towards the outer side in the vehicle width direction of the vehicle 2 widens.

As mentioned above, the high-beam unit 6, low-beam unit 7 and projector unit 8 of each of the left-side headlight unit 4 and right-side headlight unit 5 operate under the management of the lamp control ECU 9. The lamp control ECU 9 switches the operation mode of the vehicle lighting device 1, based the outputs from a higher-order ECU, light switch, light switch lever, etc., which are not shown, equipped to the vehicle 2, as well as information acquired by an environmental information acquisition device 20 described later. In other words, the lamp control ECU 9 supplies a control signal to the high-beam unit 6, low-beam unit 7 and projector unit 8, and switches the operation mode of each of these units.

Figure 4:
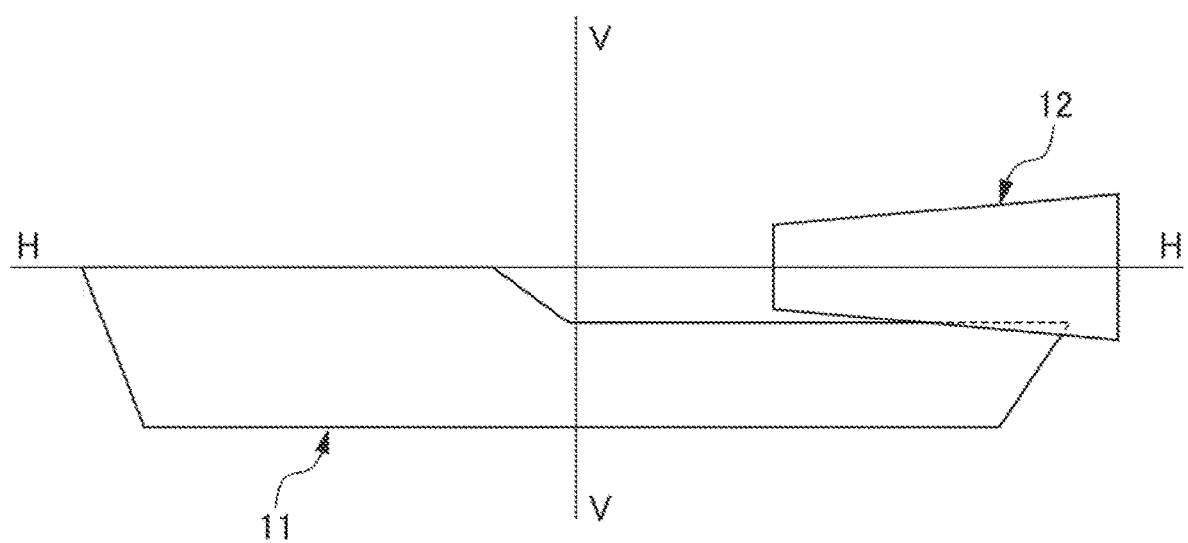
FIG. 4 is a view showing an irradiation region of a lamp in the case of the vehicle lighting device in FIG. 2 operating in low-beam mode.

FIG. 4 is a view showing the irradiation region of irradiation light by the vehicle lighting device 1, in the case of the operation mode according to the lamp control ECU 9 being set to the low-beam mode. At night, when the light switch is in the position of "auto", and the light switch lever is at a position other than low beam, the vehicle lighting device 1 is often in the state of high-beam mode. In this state, when the camera detects oncoming vehicles, ahead vehicles or a certain number of street lights, the operation mode of the vehicle lighting device 1 switches to the low-beam mode by the lamp control ECU 9. During low-beam mode, the high-beam unit 6 is turned off under the control by the lamp control ECU 9, the low-beam unit 7 irradiates the low-beam irradiation region 11, and the projector unit 8 irradiates the right-side pattern irradiation region 12.

Figure 5:
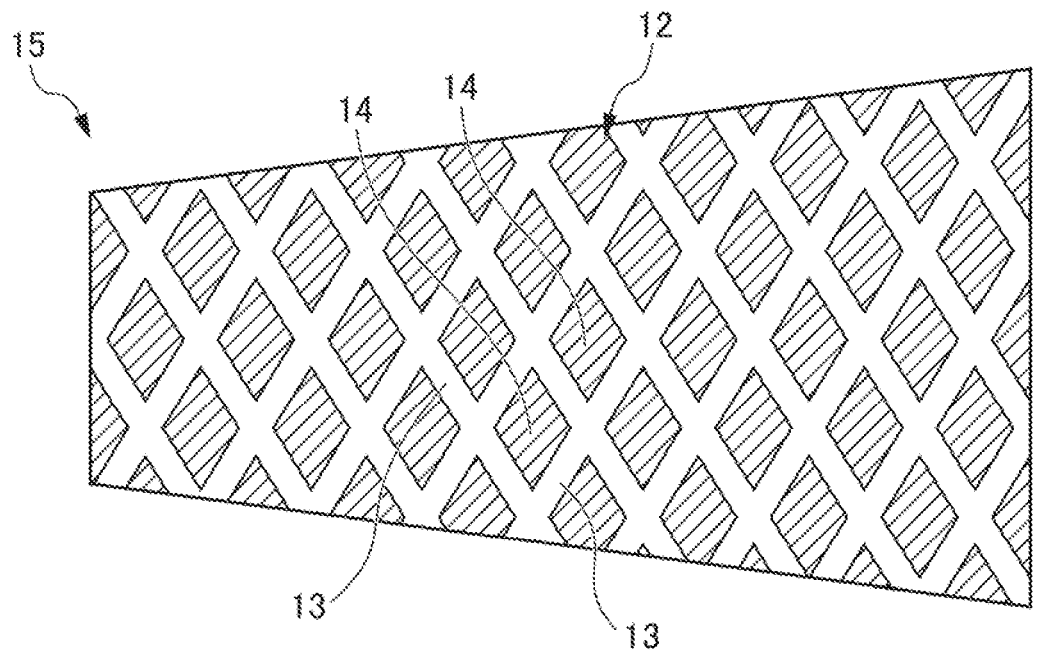
FIG. 5 is a view showing an example of an irradiation pattern by a pattern irradiation part of the vehicle lighting device in FIG. 2.

During low-beam mode, the right-side pattern irradiation region 12 occupies a wide region of the trapezoidal shape in landscape orientation including the aforementioned overlap region 12a. In this wide region, pattern irradiation light is irradiated from the projector unit 8 in a bright/dark mixed irradiation pattern 15 in which the bright regions 13 and dark regions 14 are alternately repeated, as shown in FIG. 5. The bright/dark mixed irradiation pattern 15 in FIG. 5 in particular is a sloped rhombus lattice pattern from the bright regions 13 of a mesh design of a sloped rhombus lattice, and dark regions 14 surrounded by these right regions 13.

By the irradiated light of the bright/dark mixed irradiation pattern 15 from the projector unit 8 of the right-side headlight unit 5, the presence of a pedestrian on the roadside is easily recognized from the driver by the visual characteristic of humans. Even under adverse conditions such as night and rainy weather, it is possible to improve the overlooking of pedestrians by the driver.

Herein, the current location surroundings of the vehicle 2 being rainy weather is recognized based on information acquired by the environmental information acquisition device 20. In FIG. 2, the camera 16, rain sensor 17, wiper switch 18, car navigation system 19 constitute the environmental information acquisition device 20 which acquires information related to the moisture environment around the vehicle 2 either independently, or in cooperation with each other.

The camera 16 acquires information related to being rainy weather from the situation of the imaging field of view. The rain sensor 17 detects raindrops on the front windshield surface. The wiper switch 18 is turned "ON" in the case of raindrops adhering to the front windshield, and thus can be regarded as corresponding to a detection value indicating that the probability of this "ON" being rainy weather is high. The car navigation system 19 derives that the vehicle 2 surrounding is rainy weather, from the current location of the vehicle 2, time, weather forecast, etc. In the case of configuring the environmental information acquisition device 20 by the rain sensor 17 individually, it is possible to detect as being rainy weather by a relatively simple configuration.

On the other hand, in the vehicle 2, the day/night demarcation is identified by the lamp control ECU 9 based on the detection value related to the illumination around the vehicle 2 acquired by the camera 16, rain sensor 17, etc., and/or information of the current time of the car navigation system 19, etc.

Figure 6:
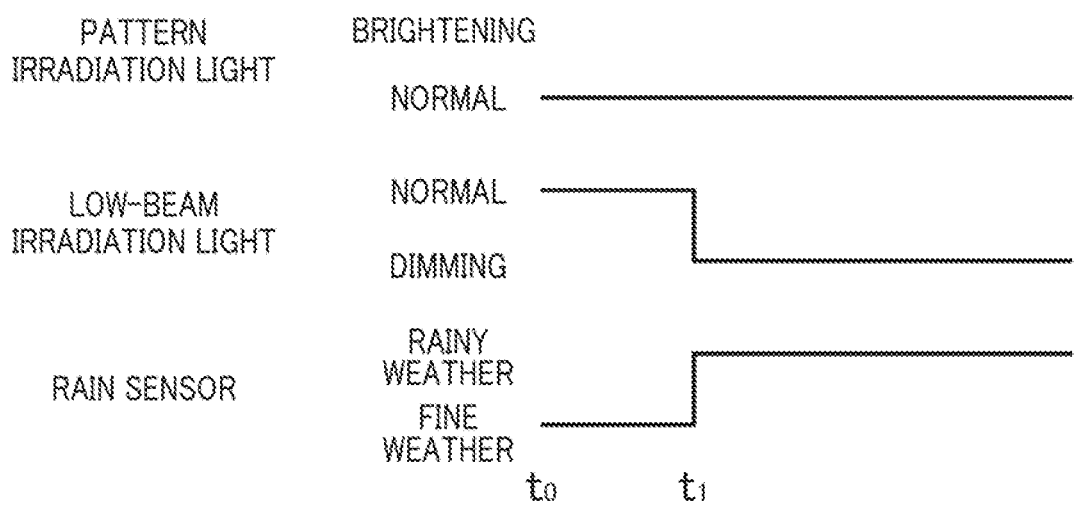
FIG. 6 is a view showing an example of an operation mode of the low-beam irradiation part and pattern irradiation part in the case of an environmental information acquisition device of the vehicle lighting device of FIG. 2 detecting as being rainy weather.

FIG. 6 is a view showing an example of an operation mode of the low-beam unit 7 and the projector unit 8 as a pattern irradiation unit, in the case of the environmental information acquisition device 20 of the vehicle lighting device in FIG. 2 being rainy weather. In FIG. 6, in the time interval from time t0 until reaching time t1, the output of the rain sensor 17 is a "fine weather" corresponding value. At this time, the low-beam unit 7 irradiates the normal intensity low beam in the "normal" mode. In addition, at this time, the projector unit 8 irradiates the pattern irradiation light of normal intensity in the "normal" mode.

Due to being "fine weather", it is rare for the road surface on which the vehicle 2 travels to be wet and puddles to form. Therefore, even if maintaining the irradiation of the low beam at the normal intensity, the water reflection of the low beam does not irradiate the pedestrian, and the contrast of the irradiation pattern by the projector unit 8 will not be reduced. For this reason, by the irradiation light of the bright/dark mixed irradiation pattern 15 from the projector unit 8, the presence of a pedestrian on the roadside is easily recognized from the driver by the visual characteristic of humans.

On the other hand, in FIG. 6, when reaching time 1 and later, the output of the rain sensor 17 is a "rainy weather" corresponding value. At this time, the low-beam unit 7 is a "dimming" mode in which the irradiation light is dimmer than "normal" mode, and includes a lamp-off state. In the present example, at this time, the projector unit 8 irradiates the pattern irradiation light of normal intensity maintaining the "normal" mode. With "rainy weather", the road surface on which the vehicle 2 is traveling is wet and puddles form.

However, since the low-beam irradiation value from the low-beam unit 7 is dimmed, it is possible to reduce the degree by which the pedestrian is illuminated by water reflection of the low-beam irradiation light on the road surface. For this reason, a decline in contrast by the pattern irradiation irradiated from the projector unit 8 to the pedestrian is suppressed. Therefore, even under adverse conditions such as nighttime and rainy weather, the irradiation light of the bright/dark mixed irradiation pattern 15 from the projector unit 8 acts effectively, and the presence of a pedestrian on the roadside is easily recognized from the driver by the visual characteristics of humans.

In FIG. 6, switching of operation mode between "normal" and "dimming" of the low-beam unit 7 according to the output of the rain sensor 17 is performed under the management of the lamp control ECU 9.

Figure 7:
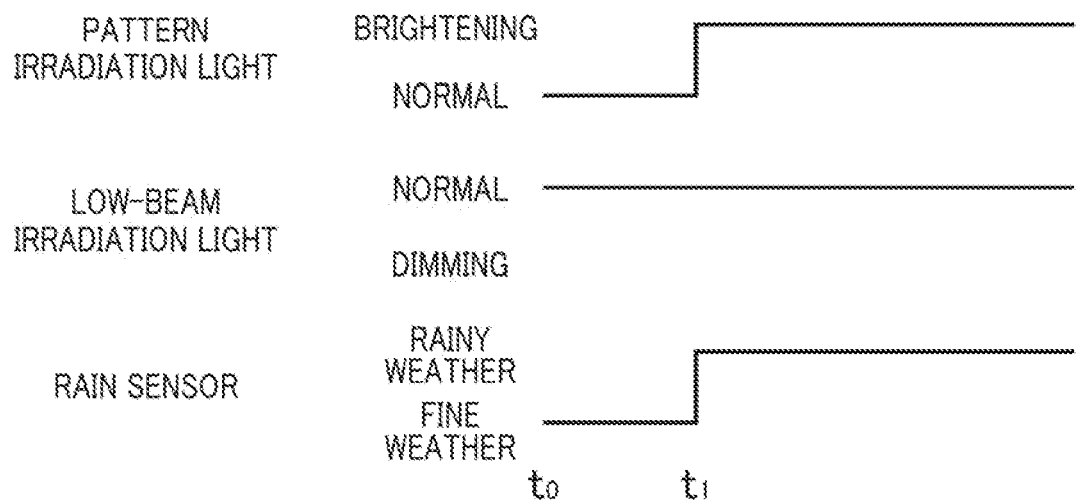
FIG. 7 is a view showing another example of an operation mode of the low-beam irradiation part and pattern irradiation part in the case of an environmental information acquisition device of the vehicle lighting device of FIG. 2 detecting as being rainy weather.

FIG. 7 is a view showing another example of an operation mode of the low-beam unit 7 and the projector unit 8 as a pattern irradiation unit in the case of the environmental information acquisition device 20 of the vehicle lighting device in FIG. 2 being rainy weather. In FIG. 7, the operation of the rain sensor 17, low-beam unit 7 and projector unit 8 in the time internal from time t0 until reaching time t1 is no different from the case of FIG. 6.

The point of difference of FIG. 7 from the case of FIG. 6 is the point in that the low-beam unit 7 maintains "normal" mode, while the projector unit 8 transitions from "normal" mode to "brightening" mode, even if the output of the rain sensor 17 indicates "rainy weather" corresponding value when reaching time t1 and after. In the "brightening" mode, the projector unit 8 irradiates the pattern irradiation light in higher intensity than the normal intensity.

Therefore, even when the water reflection of low-beam irradiation light from normal intensity irradiates the pedestrian, the contrast of the irradiation pattern from the projector unit 8 is hardly inhibited. For this reason, by the irradiation light of a brightened bright/dark mixed irradiation pattern 15 from the projector unit 8, the presence of a pedestrian on the roadside is easily recognized from the driver by the visual characteristic of humans.

In FIG. 7, the switching of the operation mode between "normal" and "brightening" of the projector unit 8 according to the output of the rain sensor 17 is performed under management of the lamp control ECU 9.

Figure 8:
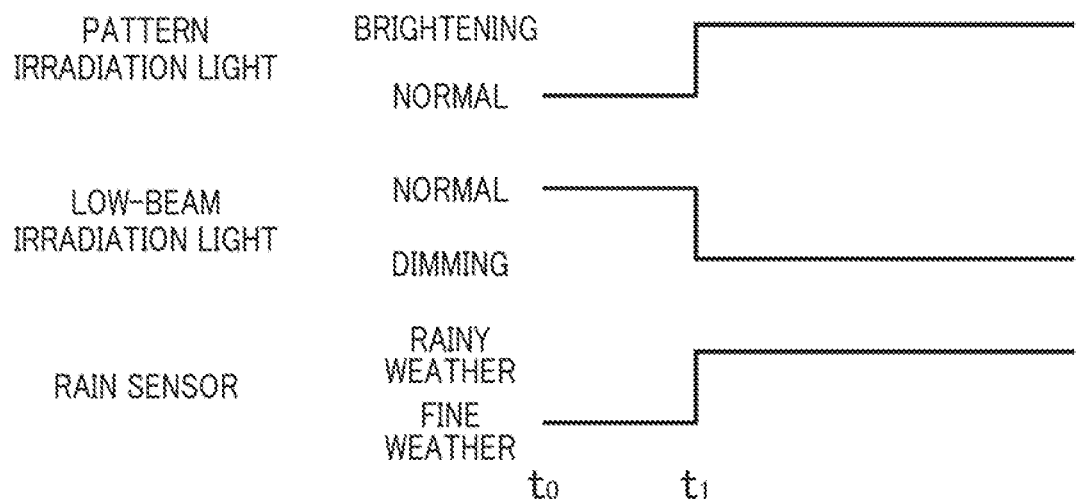
FIG. 8 is a view showing another example of an operation mode of the low-beam irradiation part and pattern irradiation part in the case of an environmental information acquisition device of the vehicle lighting device of FIG. 2 detecting as being rainy weather.

FIG. 8 is a view showing yet another example of an operation mode of the low-beam unit 7 and the projector unit 8 as a pattern irradiation unit in the case of the environmental information acquisition device 20 of the vehicle lighting device in FIG. 2 being rainy weather. In FIG. 8, operation of the rain sensor 17, low-beam unit 7 and projector unit 8 in the time interval from time t0 until reaching time t1 is no different from the case of FIG. 6.

The point of difference of FIG. 8 from the case of FIG. 6 is in the point of the low-beam unit 7 transitioning from "normal" mode to "dimming" mode, and simultaneously the projector unit 8 transitioning from "normal mode" to "brightening" mode, in the case of the output of the rain sensor 17 indicating "rainy weather" corresponding value when reaching time t1 and later. In the example of FIG. 8, even when the water reflection of the low-beam irradiation light irradiates a pedestrian, the low-beam irradiation light is dimmer than the normal intensity, and the projector unit 8 irradiates the pattern irradiation light in higher intensity than the normal intensity. For this reason, the water reflection of the low-beam irradiation light is reduced, and the irradiation light of the bright/dark mixed irradiation pattern 15 is brightened to be irradiated on the pedestrian from the projector unit 8, and the contrast from the pattern irradiation is secured. As a result thereof, the presence of a pedestrian on the roadside is remarkably recognized from the driver by the visual characteristic of humans.

In FIG. 8, the switching of operation modes of the low-beam unit 7 and projector unit 8 according to the output of the rain sensor 17 is performed under the management of the lamp control ECU 9.

According to the vehicle lighting device 1 of the present embodiment, the following effects are exerted.

(1) With the vehicle lighting device 1, in the case of the environmental information acquisition device 20 acquiring information corresponding to a situation having a high probability of the road surface being wet, and communicating to the lamp control ECU 9, the lamp control ECU 9 dims the irradiation light in the low-beam unit 7. For this reason, it is possible to reduce the degree at which a pedestrian is illuminated by water reflection of the low-beam irradiation light on the road surface. Therefore, a decline in contrast from the pattern irradiation irradiated from the projector unit 8 to a pedestrian is suppressed. As a result thereof, the pedestrian visibility on the side of the driver is maintained.

(2) With the vehicle lighting device 1, in the case of being at night and rainy weather, since the lamp control ECU 9 dims the irradiation light in the low-beam unit 7, it is possible to reduce the degree at which the pedestrian is illuminated by water reflection of low-beam irradiation light on the road surface. For this reason, the contrast of the irradiation pattern irradiated from the projector unit 8 to the pedestrian is hardly hindered, and pedestrian visibility on the side of the driver is maintained.

Although an embodiment of the present invention has been explained above, the present invention is not to be limited thereto. The configurations of detailed parts may be modified as appropriate within the scope of the gist of the present invention. In the aforementioned embodiment, a configuration is adopted in which the irradiation light in the low-beam unit 7 is dimmed according to the information related to the moisture environment around the vehicle acquired by the environmental information acquisition device 20, and/or the irradiation light is brightened in the projector unit 8, under the control of the lamp control ECU 9. Alternatively, for example, it is possible to adopt a configuration which similarly controls the low-beam unit 7 and/or projector unit 8, by a higher-order ECU that also grasps the information related to the moisture environment around the vehicle based on communication with outside. In addition, the irradiation pattern by the projector unit 8 is not limited to the aforementioned bright/dark mixed irradiation pattern 15, and can also employ a checkerboard irradiation pattern or striped irradiation pattern.

EXPLANATION OF REFERENCE NUMERALS

1 vehicle lighting device
2 vehicle
3 test screen
4 left-side headlight unit
5 right-side headlight unit
6 high-beam unit
7 low-beam unit
8 projector unit (pattern irradiation part)
9 lamp control ECU
10 high-beam irradiation region (upper irradiation region)
11 low-beam irradiation region (lower irradiation region)
12 right-side pattern irradiation region (lateral irradiation region)
12a overlap region
13 bright region
14 dark region
15 bright/dark mixed irradiation pattern
16 pattern
17 rain sensor
18 wiper switch
19 car navigation system
20 environmental information acquisition device

What is claimed is:

1. A vehicle lighting device comprising:
a low-beam irradiation part which illuminates a lower irradiation region ahead and below a vehicle;
a pattern irradiation part which irradiates irradiation light on a lateral irradiation region which is on a side of a travel path of the vehicle in an irradiation pattern in which bright regions and dark regions are alternately repeated;
an environmental information acquisition device which acquires information related to a moisture environment around the vehicle; and
a controller which changes an irradiation mode of the low-beam irradiation part and/or the pattern irradiation part based on information acquired by the environmental information acquisition device.

2. The vehicle lighting device according to claim 1, wherein the controller dims irradiation light in the low-beam irradiation part, and/or brightens irradiation light in the pattern irradiation part in a case of acquiring environmental information indicating being at night and rainy weather from the environmental information acquisition device.

\* \* \* \* \*